Dec. 17, 1935.  E. H. KOCHER  2,024,233
CENTRAL LUBRICATION
Original Filed June 6, 1932   7 Sheets-Sheet 1
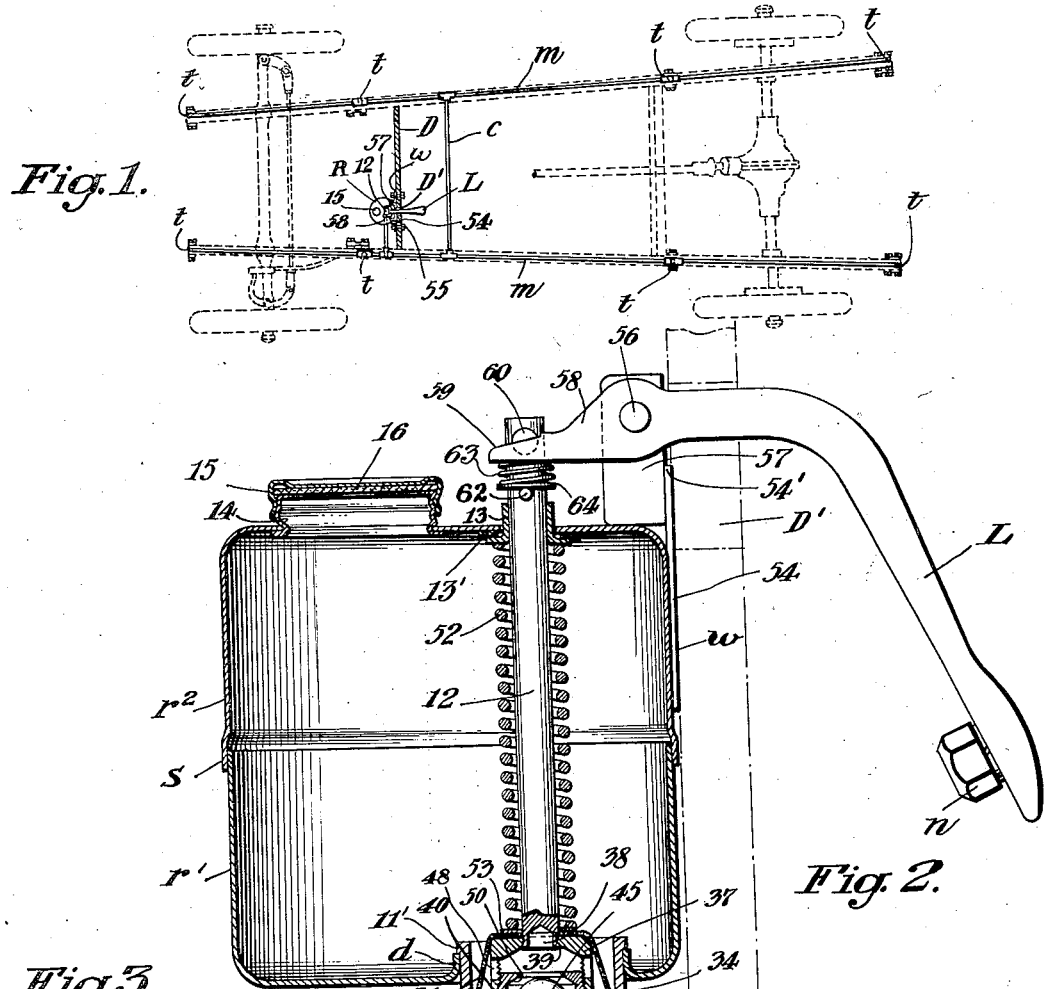
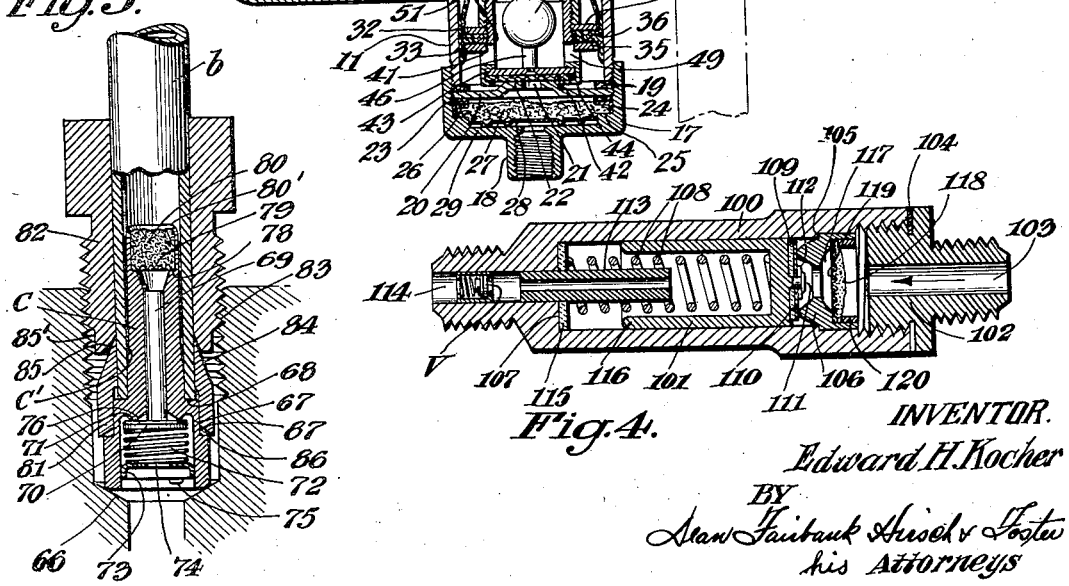
INVENTOR.
Edward H. Kocher
BY
Alan Fairbank Hirsch & Foster
his Attorneys

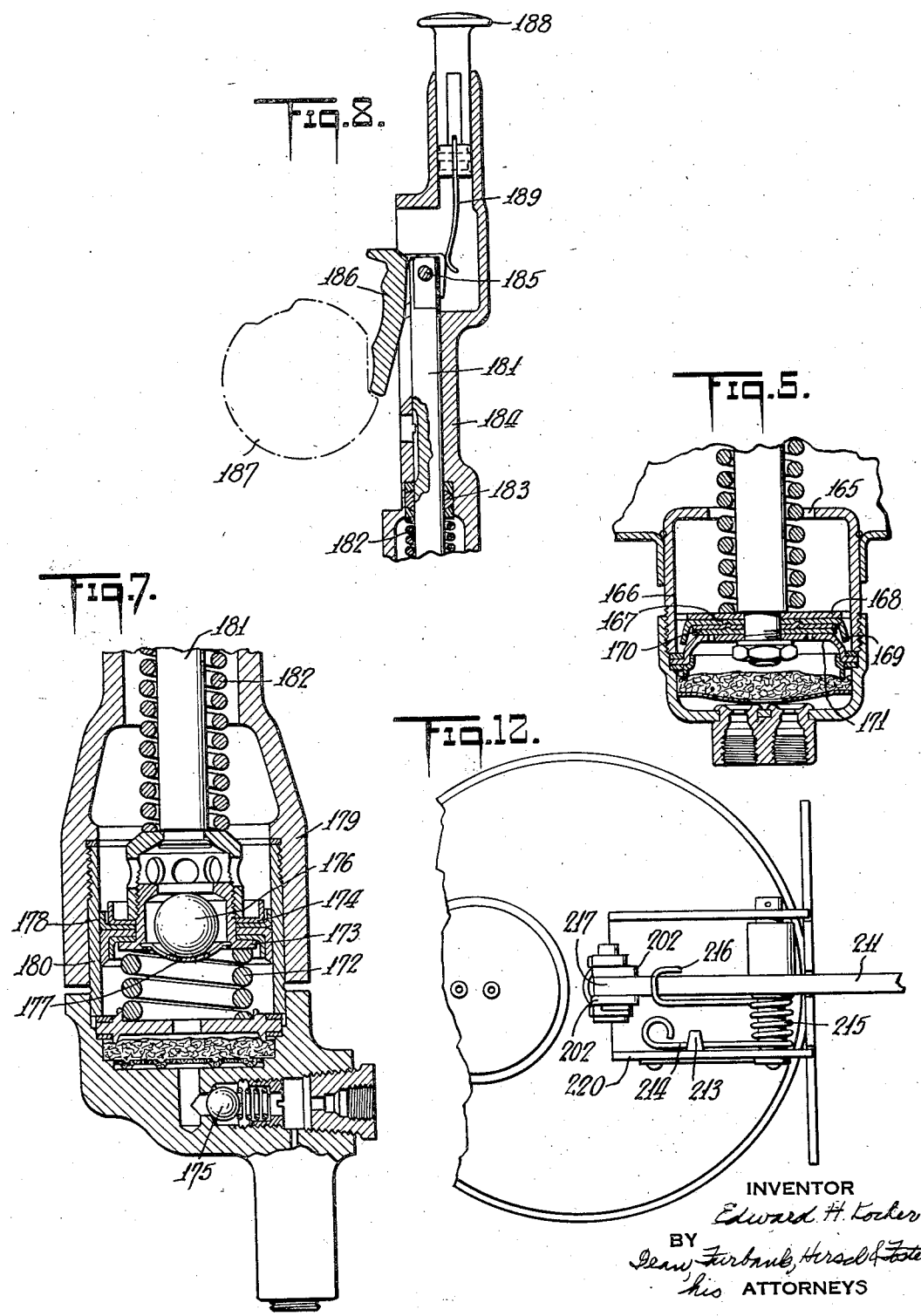

Dec. 17, 1935.  E. H. KOCHER  2,024,233
CENTRAL LUBRICATION
Original Filed June 6, 1932  7 Sheets-Sheet 3
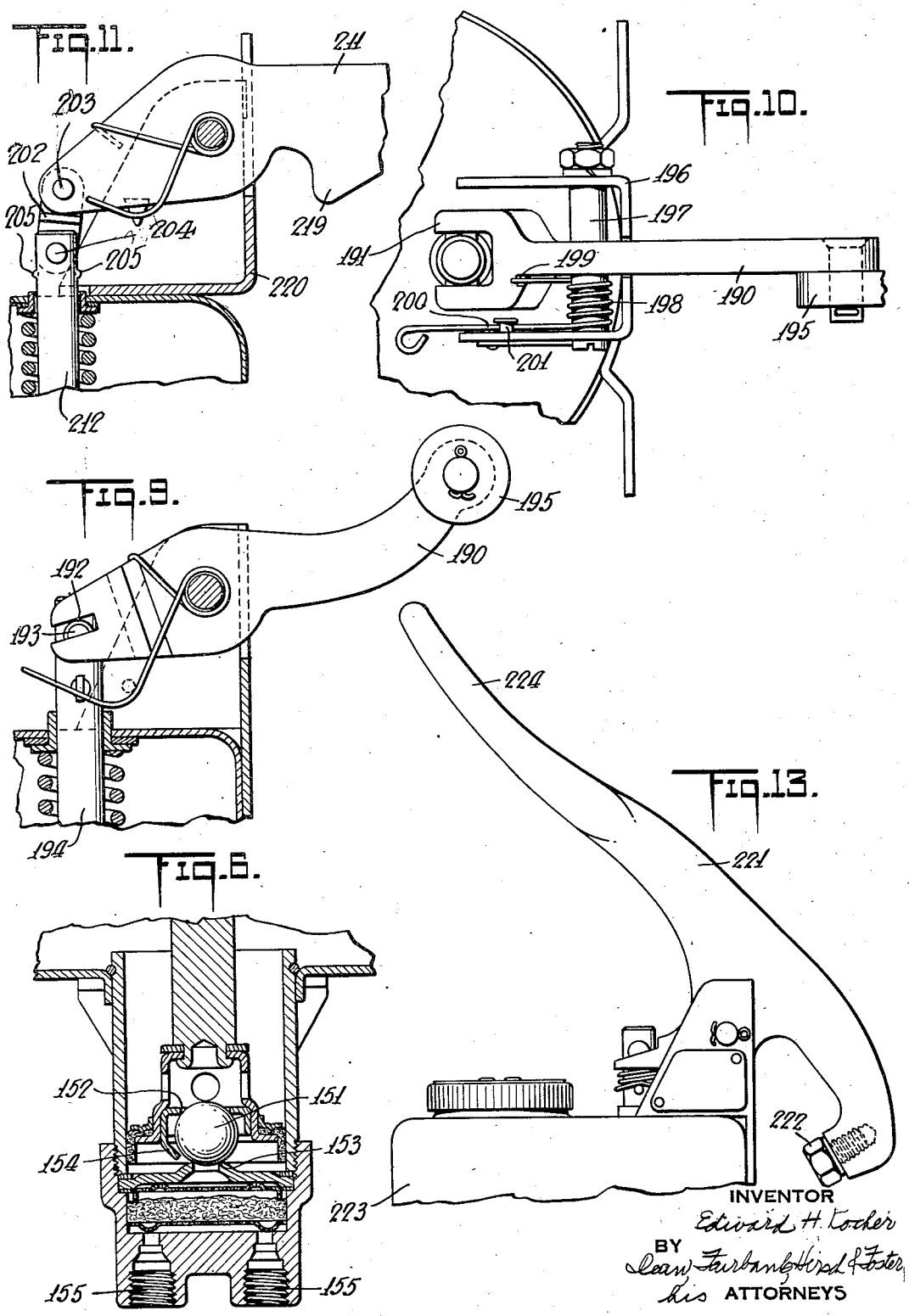
INVENTOR
Edward H. Kocher
BY Dean Fairbank Hirsh & Foster
his ATTORNEYS Dec. 17, 1935.  E. H. KOCHER  2,024,233
CENTRAL LUBRICATION
Original Filed June 6, 1932   7 Sheets-Sheet 4
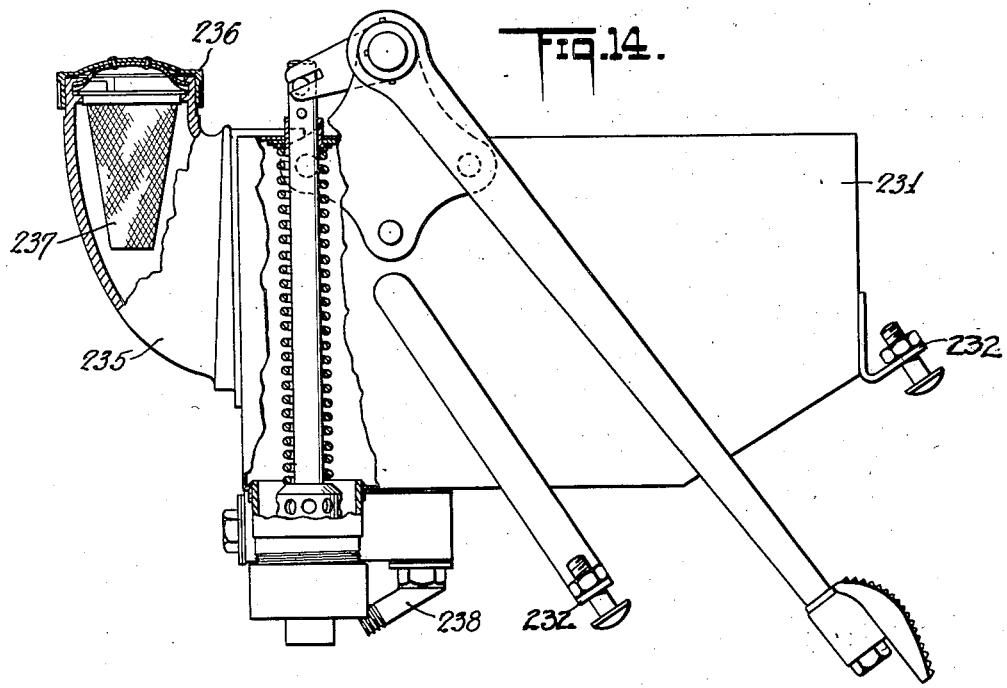
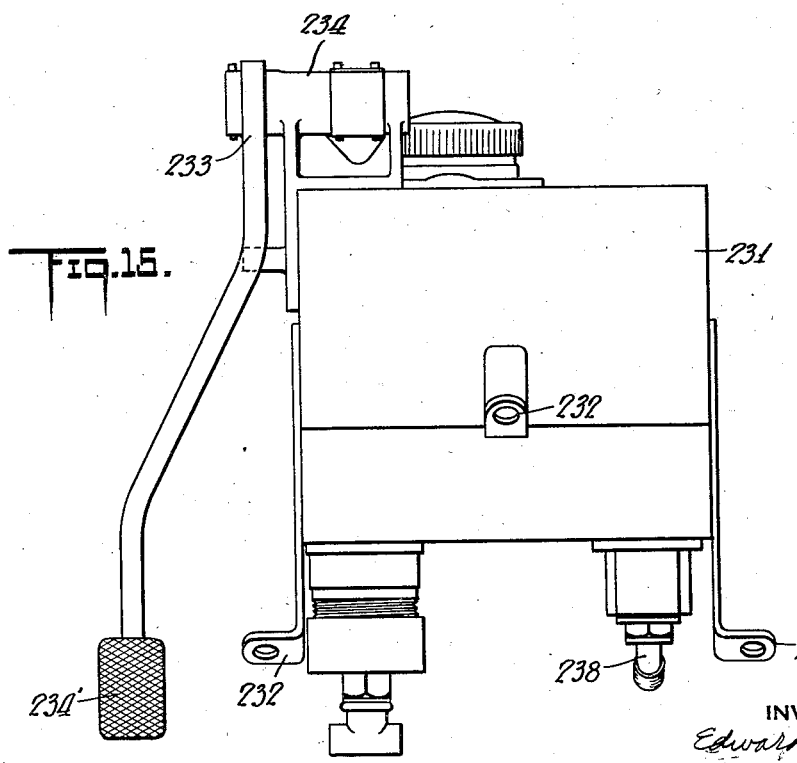
INVENTOR
Edward H. Kocher
BY
his ATTORNEYS Dec. 17, 1935.     E. H. KOCHER     2,024,233
CENTRAL LUBRICATION
Original Filed June 6, 1932     7 Sheets-Sheet 5
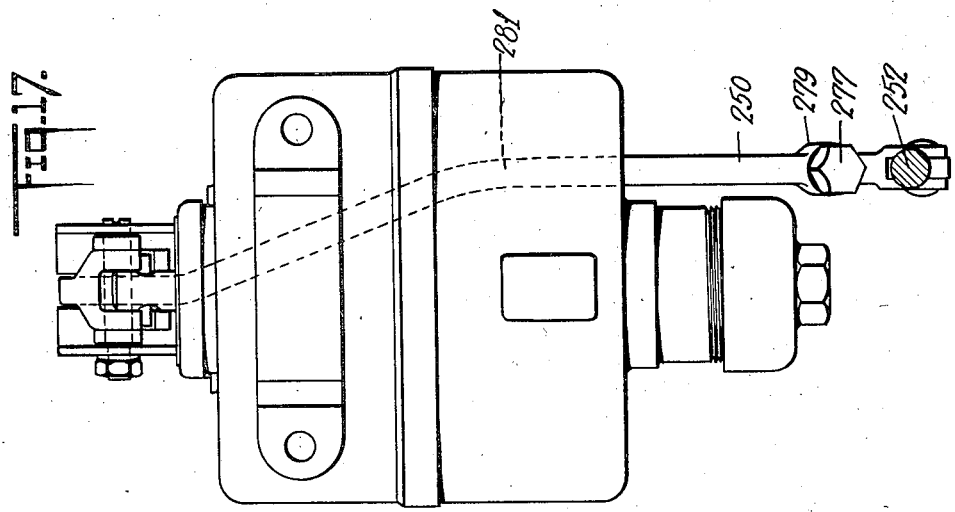
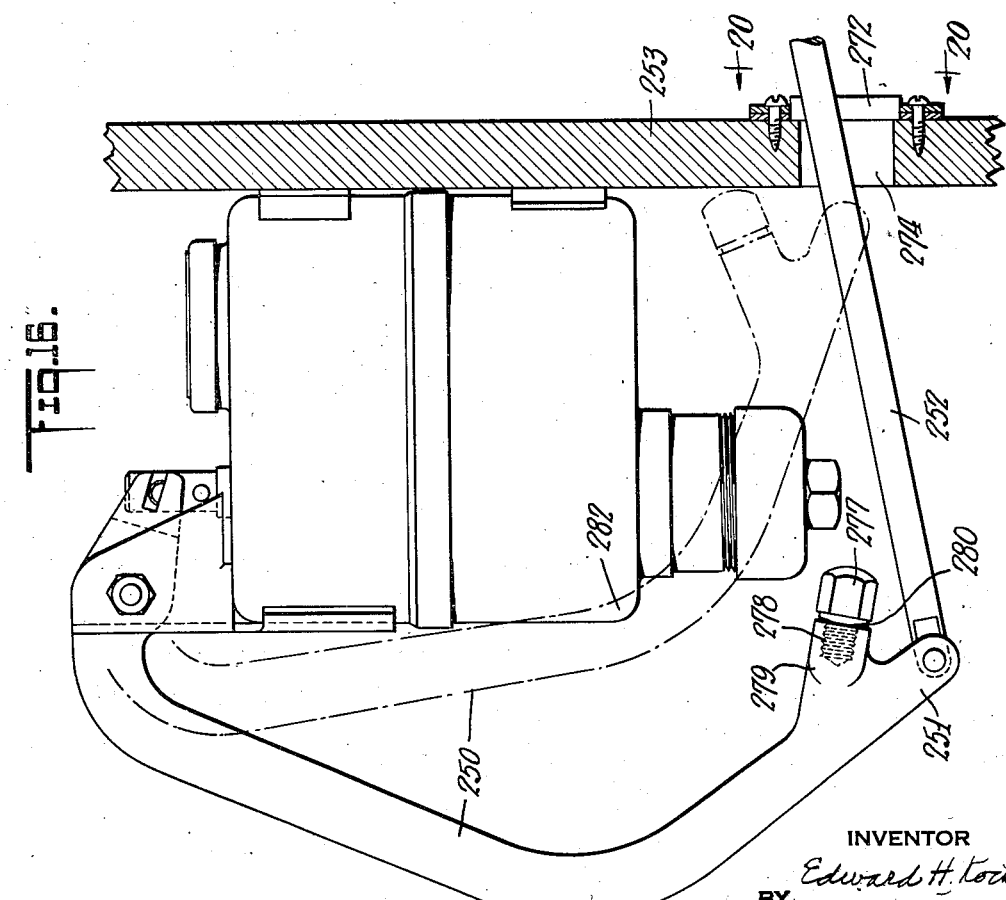
INVENTOR
Edward H. Kocher
BY
Dean Fairbank Hirsch & Foster
his ATTORNEYS

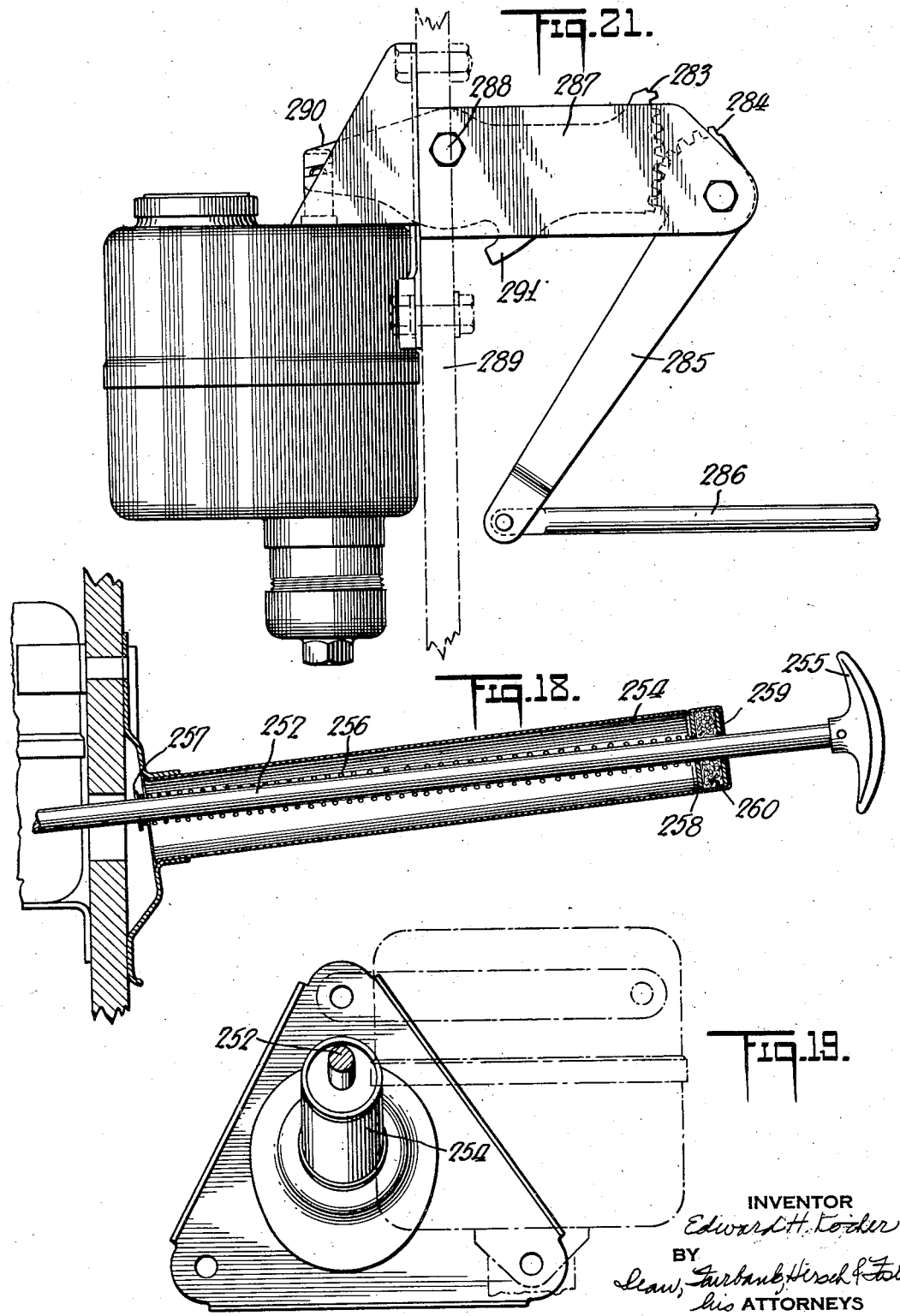

Dec. 17, 1935.  E. H. KOCHER  2,024,233
CENTRAL LUBRICATION
Original Filed June 6, 1932   7 Sheets-Sheet 7
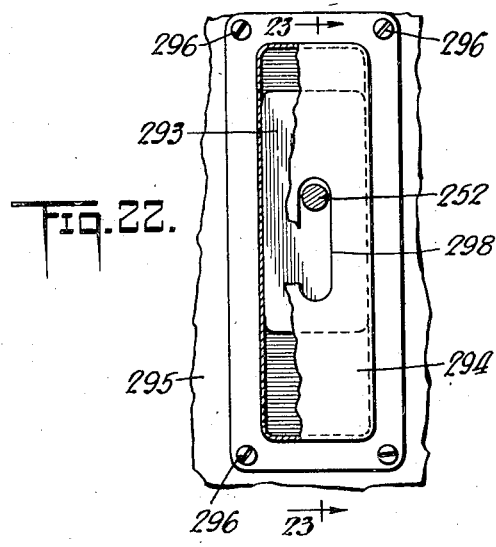
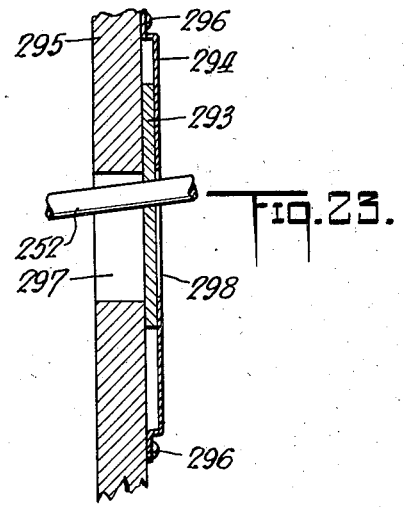
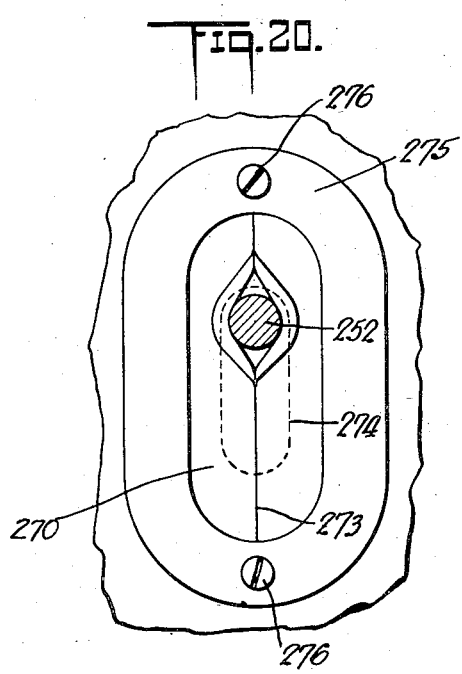
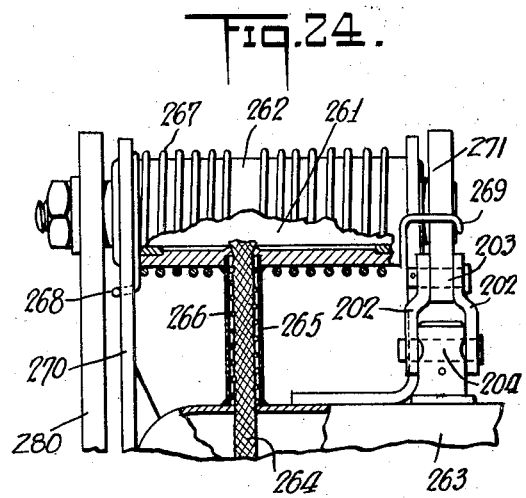
INVENTOR
Edward H. Kocher
BY
Leary, Fairbank, Hirsch & Foster
his ATTORNEYS Patented Dec. 17, 1935

2,024,233

UNITED STATES PATENT OFFICE 2,024,233

CENTRAL LUBRICATION

Edward H. Kocher, Boonton, N. J., assignor to Auto Research Corporation, a corporation of Delaware Application June 6, 1932, Serial No. 615,616. Renewed March 14, 1935. In Great Britain March 13, 1926

25 Claims. (Cl. 184—7)

The present invention is concerned with remote control through distribution systems and is particularly concerned with supply and pressure installations particularly adapted for association with said systems, especially useful for central automobile chassis lubrication.

Among the objects of the present invention are the elimination of oil or grease cups or other bulky fittings at the various bearings; the operation being affected by a single simple non-selective manipulation for concurrent feed with accurate sub-division among the various outlets through which the system is to emit; the avoidance of any need for manipulation at or near the outlets, whether for initially preparing the system for operation, for cleaning, or for adjustment; the conversion of a small manual or pedal effort exerted for but a few moments into relatively high line pressure automatically sustained throughout the pipe line, to effect the emission of predetermined quantities of oil through the various distributed outlets, substantially regardless of the viscosity of the oil; the assurance that the distributing system between the source and the outlets will remain substantially full of lubricant at all times even though the operating manipulation be performed one or more times without a supply of lubricant available; or the piping system be opened at any one locality as due to the destruction, repair, or replacement of a length of the pipe or of a terminal fitting; and the provision of an inherent indication of a break in the line, or a lack of lubricant in the reservoir without the need for any special alarm devices, gauges or the like.

Another object is to provide a supply installation for lubricating systems which is of simple and inexpensive construction, which may be conveniently positioned in accessible locations around the mechanism to be lubricated, which is adapted to be arranged so as to be actuated by a hand lever, a foot pedal or by an automatic arrangement without substantial change in design, and which is also broadly applicable to a wide variety of lubricating installations having different types of metering or flow controlling outlets for regulating the flow of lubricant to the bearings.

Another object is to provide a unitary supply and pressure installation for a central lubricating system in which the pump piston valve and filter arrangements are combined in a unitary assembly readily available for inspection and repair at any time without the derangement of the system, and in which the actuating connections, whether manual or automatic, are made in such a way as to eliminate the need for packing or the possibility of leakage or drippage from the reservoir.

Other objects are in part obvious and in part pointed out hereinafter.

According to the preferred constructions of this present invention, a vertical reservoir is formed in a unitary structure with a vertical pump structure or the pump is positioned apart from the reservoir and fed by gravity therefrom. In the former construction the pump cylinder generally projects below the bottom of the reservoir, and the lower portion of the pump cylinder is provided with a filter which is held in position by a detachable clamping element so that the filter may be removed for inspection and replacement and permit access to the pump piston and valve. The detachable clamping element is preferably provided with one or more outlet connections for the lubricant distributing piping system.

Where the reservoir is circular or cylindrical in contour, the pump cylinder is preferably placed to one side of the center of the cylinder as to provide ample space for a filler arrangement, and, if desired, for a level indicator or volume gauge.

In one embodiment of the present invention where the pump cylinder is unitary with the reservoir, the end of the piston rod or connecting rod attached to the upper end thereof, projects above the top of the tank and the uppermost lubricant level therein so that it is not necessary to provide any packing material or guard against leakage at the point of connection of the connecting rod or piston rod to the reservoir or pump cylinder. The top of the piston rod is preferably operatively connected to a lever or to a series of levers by a cam or linkage which will enable manual or automatic actuation of the pump as may be desired from any position about the mechanism to be lubricated.

In application to an automobile chassis the top of the piston rod or connecting rod preferably above the reservoir has a linkage or cam connection to an angle or bell crank lever, the operating end of which projects through the dashboard to adjacent the driver, and is provided with a handle or with a pedal according to its location in respect to the driver when he is seated in the vehicle. In some forms instead of having the operating arm of the bell crank lever project directly through the dashboard, it may be more convenient to connect the above mentioned to another lever or pull rod which may be more conveniently positioned in respect to the driver.

Preferably when the supply installation is associated with a central chassis lubricating system, the actuating lever is caused to project through the dashboard into the driver's compartment in such a way as to minimize any tendency of the hot gases from the engine compartment seeping into the driver's compartment.

The pump is most desirably of the form in which the charging operation is performed by foot, by hand or automatically, simultaneously with the stressing of the spring, while the discharge results from release of the spring and return of the plunger or piston.

Generally in the present invention the pump serves to close its own outlet at the termination of the stroke and it is provided with an enclosure containing an inlet valve, cooperating with an inlet port in the piston, which upon movement of the pump in one direction opens said port and permits charging of the pump cylinder, and upon movement in the other direction closes said inlet port and causes discharge into the line.

The outlets of the system may be of the drip plug or fixed restriction type so as to proportion the charge of lubricant among the various bearings to be lubricated and they may be of the general form of construction of those of the Bijur Patents Nos. 1,632,771 and 1,632,772. If desired these drip plug outlets may be replaced in part or whole by measuring valves or reciprocating piston devices of the volume displacement type with suitable provision to permit disposal of the excess volume of the pump over that required to fill the measuring chambers of the measuring valves and for satisfactory return of said measuring valves.

In the accompanying drawings, in which are shown several of the various possible embodiments of the invention, Fig. 1 is a diagrammatic plan view of an automobile provided with a central lubricating installation, Fig. 2 is a transverse sectional view of one form of a lubricant supply installation, Figs. 3 and 4 are transverse sectional views through different types of flow metering or proportioning outlet terminals to be associated with the outlets of the distributing system, Figs. 5 and 6 are transverse sectional views of alternative forms of pump units, Figs. 7 and 8 are side sectional views of one form of an automatically actuated supply installation, Fig. 7 showing the pump unit and Fig. 8 showing the actuating arrangement on a smaller scale, Figs. 9 and 10 are respectively fragmentary side sectional and top views of another form of an automatically actuated supply installation, Figs. 11 and 12 are respectively side sectional and top views of another actuating arrangement for the supply installation, Fig. 13 is a side view showing another form of actuating arrangement, Figs. 14 and 15 are respectively side and rear views of another form of supply installation;

Figs. 16 to 20 show another form of actuating arrangement, Figs. 16 and 17 being respectively side and rear views of the tank with the lever in position, Figs. 18 and 19 being respectively side sectional and rear views of the pull rod arrangement, and Fig. 20 being a rear view upon an enlarged scale on the line 20—20 of Fig. 16, Fig. 21 is a side view of another form of actuating arrangement, Figs. 22 and 23 show an alternative arrangement similar to that of Fig. 20, Fig. 22 being a rear view, partly in section, and Fig. 23 being a side sectional view upon the line 23—23 of Fig. 22, and Fig. 24 shows a side view of an arrangement for lubricating the pivotal bearings of the actuating lever.

In Fig. 1 of the drawings is shown the plan of a motor vehicle chassis, as a specific example of one form of the main varieties of mechanisms to which the present invention is applicable. In this figure there is indicated purely diagrammatically some of the various bearings to be supplied from a centralized source, which includes a reservoir R attached in front of the dashboard D and having an operating pedal L accessible from the driver's seat. The reservoir and pump assembly is separately shown on a larger scale in Fig. 2 and will be later described in detail. The piping system is equipped from the reservoir and includes a cross length $c$ connected at its ends to mains $m$ which extend the length of the vehicle and are provided with a plurality of intermediate branch outlets as well as outlets at their ends, which outlets have flow controlling terminals $t$ for feeding the spring hinge and shackle bearings. The conduit for bridging from the frame to the axle, to supply the king pin, tie rod, drag link, brake or other bearings or parts of the axle, is not shown, as this is not essential to a comprehension of my invention. All of the terminals $t$ are preferably provided with flow controlling units, such as drip plugs and/or measuring valves which are to be later described, and are separately shown on an enlarged scale in Figs. 3 and 4, one preferred embodiment including a combination of both drip plugs and measuring valves.

*The reservoir and pump*

Referring now to Fig. 2, the reservoir R is shown as a sheet metal structure composed of a pair of complementary cupped members $r'$ and $r^2$, the edges of which are telescoped and soldered or brazed together at $s$. The metal of the bottom is turned upward about an aperture therethrough to form a rim $d$ upon which rests a shoulder 11' of a pump cylinder 11, which protrudes therebelow and is preferably soldered or brazed in place. The rim $d$ determines a trap for residual lubricant in the reservoir. Within the cylinder is disposed a piston assembly connected to a piston rod 12, the upper end of which protrudes through a bushing 13, in a corresponding aperture in the top of the reservoir. The reservoir top has a threaded filling neck 14 crimped about a corresponding aperture laterally of the piston rod. The neck is closed by a removable screw cap 15 rendered dust tight by a yielding gasket 16. A cap 17 is threaded over the lower end of the cylinder 11 and has an outlet socket 18 for attachment of the inlet end of the piping system, which may be affixed by the terminal construction shown in Fig. 3 and described below. The cap presses a gasket washer 19 against the lower edge of the cylinder, this washer constituting a backing for a plunger seating disk 20 centrally perforated at 21 and embossed upward at 22. The rim of the seating disk is contacted by a gasket washer 23 which, in turn, is supported by a sheet metal frame 24, pressed upward by a shoulder 25 in the cap 17 and having an inturned rim 26 encircling and compressing the rim of a filter disk 27. The filter disk is sustained upon an embossed wire mesh screen 28, which, in turn, rests upon the flat inner face 29 of the cap. The screen 28 sustains the filter spaced from face 29, to permit propulsion of lubricant through the entire effective area and without disruptive strains upon the filter material and also prevents loose hair of the filter felt from being carried into the pipe system with the oil flow.

The piston comprises preferably a metal cup 32 and a leather cup 33 with oppositely facing flanges, said cups reinforced respectively by metallic plates 34 and 35 therein, the metallic cup 32 having a circular groove 36 embossed therein, which in the completed assembly is pressed into the contiguous area of the leather cup.

The piston is attached to the piston rod 12 by a construction comprising a socket or thimble 37 through the end of which the reduced end 38 of the piston rod is inserted and then upset at its protruding extremity as at 39. The piston disk elements 32, 33, 34, 35 are slipped over a hollow screw plug member 40 which is threaded into the socket 37 and has a shoulder 41 by which the inner periphery of the piston assembly is pressed against the extremity of the socket 37.

The outer extremity of the plug 40 is counterbored to accommodate a seating disk 42 of appropriate yielding material such as oil impregnated fiber backed by a metallic disk 43, said parts being secured in place by rolling inward or staking as at 44, the rim of the thin shell formation about the counterbore.

The plug 40 constitutes the cage for a spherical check valve 45, normally resting on the end of an upstanding sustaining pin 46 riveted to disk 43. The socket 37 is provided with radial inlet apertures 48 communicating with the hollow interior of the plug 40 which, in turn, has radial apertures 49 delivering below the piston. The inner end of the screw plug is tapered at 50 to provide a seat against which the ball valve is pressed during discharge stroke of the piston.

Preferably a strainer cup 51 of fine metal mesh extends at its rim between the periphery of the disk 34 and the flange of piston cup 32 and its top encircles the piston rod immediately above the socket 37. A coil spring 52 about rod 12 reacts at its upper end against bushing 13 and at its lower against a metal washer 53 about the piston rod, said spring urging the seating face 42 of the piston toward the seating disk 23 and pressing the top of strainer screen 51 against socket 37.

A supporting bracket 54 is centrally riveted or brazed against the reservoir and its wings w engage the dashboard D of the automobile, and are secured thereto by bolts and nuts 55 through the dashboard.

The reservoir is preferably mounted in position such that the pedal lever L which extends back of the dashboard through opening D' may be conveniently depressed by the foot of the seated driver. Lever L is pivoted upon a pin 56 therethrough sustained in ears 57 straddling the lever, said ears being inturned flaps of an upward extension 54' of bracket 54. The working end of the lever is forked at 58 to straddle the protruding end of piston rod 12, and a coil spring 63 encircling the piston rod and reacting against a washer 64, in turn, held in place by the protruding ends of a pin 62 therebelow, urges the fork 58 against the protruding ends 60 of a loose pin transversely through the upper extremity of the piston rod. The upper faces of the fork arms slope longitudinally at 59 and the coacting ends 60 of the upper pin are correspondingly flattened, whereby said pin is locked in place. The spring 63 serves to retain the operating lever against rattling during locomotion of the vehicle.

To assemble the reservoir, the socket 37 is slipped over the reduced end of the rod 12 which is then upset, whereupon the piston elements are clamped in position by the application of the previously assembled valve carrying plug 40. The strainer cup 51 is slipped over the end of the piston rod with its rim held between the washer 34 and the flange of cup 32. The washer 53 and the spring 52 are then passed over the piston rod whereupon the bushing 13 is applied and forced down to compress the spring which is then retained against expansion by applying the cross pin 62.

The piston assembly now described is inserted upper end foremost through the cylinder 11 until the bushing 13 over which the gasket 13' has previously been applied is arrested by the top of the reservoir. Thereupon the outlet plug elements 19, 20, 23, 24, 27 and 28 are successively inserted, the reservoir being inverted for this purpose, and the screw cap 17 is screwed home in which operation the seating disk 20 is pressed against the piston face 42, thereby drawing the piston outward to move the pin 62 from contact with the bushing 13, whereupon the operating lever L is applied.

The reservoir with the lever L previously assembled thereto is applied to the dashboard D by passing the lever L through aperture D' from in front of the dash and passing the bolts 55 through the dash and the bracket ears 54.

*Drip plug terminal construction*

Referring now to Fig. 3, this figure shows one of the many types of restriction and/or valved outlets which may be utilized. The flow controlling terminal device here shown may be accommodated in a small drilled mounting aperture or socket such as is commonly employed for grease cups or oil cups having an inwardly tapered end or bottom 66.

My flow controlling unit preferably comprises a cartridge C provided with a shank or plug portion telescoped into the end of the pipe b and formed with an enlarged head 67 affording a shoulder 68 abutting against the end of the pipe. The plugged or telescoped shank of the cartridge is axially bored to accommodate a metering pin 69 affording but minute clearance of a few hundredths of a mm. with respect to said bore to form a highly restricted passage as in the prior Bijur Patent No. 1,632,772, affording a resistance to flow large compared to that incurred in the rest of pipe line. Preferably the head 67 is formed as a valve casing and has therein a disk valve 70 urged against a seat 71 in the cartridge, said valve being normally retained against its seat by the spring 72 which, in turn, is maintained in fixed position by a metal cup 73 centrally perforated at 74 and press-fitted into the head and, moreover, staked at 75.

The cartridge C is counterbored at the end of its shank to afford a shoulder 78 against which is pressed a fine wire mesh backing dish or cup 79 for a strainer 80 retained in place by the crimping 80'.

For rendering the terminal secure I provide a compression coupling sleeve 81 tightened in position by a bushing 82 which is threaded at 83 into the corresponding tapped socket.

The compression coupling sleeve 81 is tapered at 84 only at its outer end, that comes into direct engagement with the beveled edge 85 of the threaded bushing, said bushing being reduced in diameter at its inner end at 85'. The inner end of sleeve 81 is of the maximum external diameter and rests against a peripheral shoulder 86 formed on the cartridge head, the sleeve being counterbored at said end to fit over the base of the head 67. The beveled edge of the sleeve is mill-knurled at 87, for firmer engagement thereof with the cartridge unit.

For application of the pipe terminal, the threaded bushing 82 and the compression sleeve 81 are slid over the extremity of the pipe and the shank of the cartridge drip plug assembly is inserted into the pipe against the end of which the cartridge head seats. Thereupon the pipe end is inserted into the mounting socket with the protruding valve head of the drip plug bottoming therein. The assembly is completed by simply threading home the bushing 82 with the aid of a wrench.

The axial pressure applied through the threaded bushing when it is tightened exerts axial pressure upon the coupling sleeve 81 and thereby forces the same against head 67 at shoulder 86 and the end of said head against the socket bottom 66.

Operation

For operation, the driver raises his foot slightly and depresses the pedal L to bring the end of the latter inward toward the dashboard, whereupon he lets go. Thereafter emission will take place automatically through various outlets for supplying all of the bearings to which the system is connected.

The pump is contiguous to the dashboard near which the operating lever L is pivoted so that notwithstanding the fact that the pedal is pressed in operation through but a short stroke, say 7 cm., a substantial power multiplication of say 6 to 1 is nevertheless, effected to easily overcome the resistance of the relatively powerful spring 52, the short pedal power arm of lever L being several times longer than the work arm connected to the piston rod.

The pedal end of the operating lever is appropriately curved for convenience of depression, and has a stop nut $n$ that contacts the dashboard to limit the stroke and prevent compression of spring 52 to a column spring. The stroke of the piston being quite short and the bore of the pump cylinder large, as shown, a charge adequate for the multiplicity of bearings is thus ejected by a single pump operation. During the pedal stroke, lubricant in the reservoir R is caused to pass through the strainer 51 and by way of apertures 48 past valve 45 into the chamber below the piston and above the filter disk 27, the reservoir being adequately vented through the crevice between pump rod 12 and bushing 13. When the pedal is then let go, the spring 52 expands by reaction against the bushing 13 and forces the piston downward. At the beginning of the discharge stroke, the rush of oil through the descending piston entrains the valve 45 to its seat 50, the large ports 48 precluding counterpressure that might oppose seating of the valve. Throughout the discharge action, the ball check valve 45 remains seated and prevents return of lubricant from below the piston, and the piston forced the lubricant past the filter disk 27 into the lubricant-filled pipe line. The spring 52 being substantially compressed, and relatively powerful, the pump pressure is speedily transmitted through the incompressible column of lubricant throughout the pipe line, causing the valves 70 in the drip plugs to crack off their seats.

The minute crevice about the metering pin 69, the valve 70 and the strainer plug 80 of each drip plug impose a combined resistance so high to the flow of lubricant therethrough under pressure, relative to the resistance due to the entire length of pipe line leading thereto, that said drip plugs in themselves are practically controlling of the rate of flow. The drip plug crevice about pin 69 is made so minute as to be in itself largely controlling of the resistance to flow imposed by the drip plug. This arrangement is desirable since the restriction crevice can be very accurately determined, as it is the difference in cross-section of a bore and of a length of wire, both of which are readily made with great precision. Thereby, the substantial variations are permissible which are incurred during ordinary manufacture in the strength of the valve springs 72 and in the compression and, accordingly in the resistance of the felts 80.

Lubricant is, accordingly, advanced slowly at rates substantially determined by the clearance between the metering pins and the bores of the various drip plugs to pass therefrom on to the bearings. Upon cessation of the pressure at the source, each of the valves 70 is reseated by its spring and further drip is prevented from the pipe line, which remains at all times fully charged with oil. The strainer plugs 80 function to intercept any solid particles such as metal clips or dirt that may be carried from the pipe line with the oil, toward the bearing.

The operation of stressing the spring is not much harder in winter when the oil becomes more viscous than it is in summer when the oil is thinner, but the rate of discharge would vary, the pump taking possibly 20 seconds to 2 minutes to discharge in summer, depending on the grade of oil used, and ten minutes to one hour or more in winter. The spring 52 is preferably highly stressed even in the normal position thereof shown in Fig. 2, so that the pressure exerted thereby is nearly uniform throughout the short pump stroke. A quick return of the pedal is an indication that the reservoir is empty or that there is a break in the pipe line.

The piston face being seated upon the outlet disk of the pump between operations, affords an independent seal against loss of oil from the reservoir. It also seals the heads of the line so that if one drip plug valve were defective, oil would yet not escape. It also permits a drip plug to be removed or the pipe line to be opened, without appreciable loss of oil.

As long as the reservoir has a substantial volume of lubricant therein, no air therefrom can enter the pump cylinder. When, however, the level of oil in the reservoir becomes low, so that only air or a frothy mixture of oil and air would enter the pump cylinder, such air or froth will not be forced into the pipe line, since it has too little viscosity to lift the heavy metal valve 45 to its seat. When there is no oil in the cylinder, the valve will remain unseated throughout the piston stroke. If a residue of oil settles at the bottom of the cylinder, the valve will remain open while passing through the level of air or froth and will close in its traverse through the level of oil. The pipe line, accordingly, remains filled with lubricant from the pump outlet clear to all of the drip plug relief valves, even though the pump be stroked one or more times without a charge of oil.

Measuring valve terminal construction

In Fig. 4 is shown an arrangement which may be desirably utilized to replace the flow controlling terminal of Fig. 3 at a part or majority of the bearings, and which in certain instances may also be utilized to replace the embodiment of Fig. 3 at all of the bearings.

The form of measuring valve, shown in Fig. 4, includes a fitting comprising a barrel 100 within which slides a cup-shaped piston 101 providing small clearance. The inlet end of the barrel is closed by a plug 102 having an axial bore 103 and tightened by an interposed gasket 104. Press-fitted within the bore of the barrel and against a shoulder 105 therein is a seat member 106 for the valve 101. At the outlet end of the barrel, there is provided a shoulder 107 against which reacts a coil spring 108 which extends into the hollow of the cup-shaped piston and urges the latter against the seat 106. For effectiveness of seating, the plunger is provided with a coating of vellumoid 109 faced with oiled silk 110, or the like. A small axial protrusion 111 on the valve is riveted over against a washer 112 to maintain the plunger parts assembled. Preferably the spring 108 is maintained against bowing laterally by a length of pipe 113 press-fitted into the outlet bore 114 of the fitting and extending longitudinally as a core within the spring 108 and partly into plunger 101. Preferably, also said spring presses against a disk 115 of vellumoid at shoulder 107 which serves as a seat for the rounded rim 116 of valve 101 in pressure operation.

The valve seat 106 is countersunk as at 117 at its inlet end to afford space for a strainer comprising a disk of felt 118 backed by wire mesh 119 and secured in position by a split ring 120. In operation, pressure from the source is transmitted through the strainers of each of the various measuring units on the line, and effects a propulsion of the piston 101, against the resistance of spring 108 throughout the stroke until the rim 116 thereof seats against vellumoid seat 115 in which position the inner end of pipe 113 will still be spaced from the inner end or bottom of the plunger cup.

Lubricant that had been trapped in the unit is by this operation expelled under pressure application from the pump through the pipe 113 to the bearing. In the continued application of pressure, while the pump piston is completing its stroke, lubricant will not work past the piston since the latter is then effectively seated and sealed with respect to the outlet by the vellumoid seat 115. When the pressure on the line is decreased, the spring 108 expands and slowly urges the piston 101 to the position shown in Fig. 4, while oil passes through the clearance between the barrel and the wall of the piston from the line into the measuring chamber until the valve is pressed against its seat 105 in which position it prevents exit of lubricant from the pipe line in advance thereof until pressure is again applied.

A relief valve V similar to valve 70 in Fig. 3 is disposed preferably at the bearing end of each fitting, although it may be disposed at the inlet end or in advance thereof, if desired. The relief valve serves to prevent the plunger 101 in its return from sucking oil previously discharged or air back into the measuring chamber from the bearing. The relief valves V in the system also preclude the piston from raising the column of lubricant in the pipe ahead of it, so that lubricant is compelled in the piston return to pass around said piston in order to refill the valve chamber as heretofore described. The strainer 118 prevents the entry of chips or scale from the pipe line to the seat of the measuring valve.

Substantially the full pressure applied at the outer face of the piston base is effective to propel the piston toward the outlet end and to maintain it seated thereat, since the pressure is not offset by any back or reverse pressure which would result were there effective communication established from the source of pressure to any part of the reverse face of the piston.

When the outlets are provided with measuring valve fittings, as shown in Fig. 4, the pump preferably should force a volume into the line which is in excess of the volume of all of these valves and at a sufficiently high pressure so as to insure that there will be a sufficient surge or gush of oil into the line to throw all of these valves quickly over to their discharged position. To relieve this excess of lubricant from the lines and also to relieve the pressure to permit satisfactorily rapid return of the measuring valve pistons, one or more outlet fittings such as shown in Fig. 3 are provided preferably to supply lubricant to the bearings which without disadvantageous results may receive an excess of lubricant or a quantity of lubricant which need not be as exactly proportioned as in the case of the remaining bearings. As a result some of the bearings will receive a sudden shot of oil at the commencement of the pump discharge stroke under substantial pressure, while the other bearings will receive a slow emission of oil throughout the time of descent of the pump plunger.

These additional drip plug outlets may also be caused to feed lubricant back to a lubricant reservoir or to a lubricant receptacle located somewhere on the mechanism to be lubricated, but in the preferred form they are located away from the reservoir and preferably at such a point on the system that some or a large number of the measuring valve fittings will be about equidistant from or will intervene between them and the pressure source.

If assurance is had that clean oil will be supplied to the terminal fittings, the strainers 80 and 118 may be omitted. If desired, the spring for the valves 70 and V may also be omitted, and the valves then being of the suction seated variety. If the outlets are all at about the same level, the valves 70 may be conveniently omitted. In place of the pin-in-bore restriction of Fig. 3, other restriction means may be employed such as screw plugs, compacted porous materials, and so forth.

Alternative supply installations

In Fig. 5 the inlet port 165 admits lubricant to the pump cylinder 166 and upon upstroke of the piston 167, the lubricant is drawn past openings in or scalloped edges of the disk 168 forming part of the piston assembly. Upon down stroke, the flexible member 169 will be forced out to contact with the walls of the cylinder 166, and will be constrained against excessive movement by the disk. At the end of the stroke, the outlet valve disk 170 will set upon the outlet port 171 at the bottom of the cylinder 166.

In Fig. 6 the valve 151 is caused to serve both as an inlet valve and an outlet valve so that upon down stroke, it closes the port 152 while at the end of its stroke it closes the port 153, the inwardly turned fingers 154 retaining it within the piston assembly during the upward movement of the piston upon charging of the pump cylinder. As also shown in Fig. 5, in Fig. 6 the pump is provided with two outlet connections 155. If desired, any suitable number of these connections may be employed depending upon the construction of the machine and the arrangement of the distributing piping system, all of these connections both being fed and being cut off simultaneously by the pump piston.

In Figs. 7 and 8 is shown an automatically actuated pumping arrangement, the reservoir (not shown) preferably being provided above the pump so as to feed it by gravity. In this embodiment, to eliminate any possibility of banging of the pump plunger against the bottom of the cylinder, a coil spring 172 is provided which contacts with the annulus 173 of the piston assembly. The piston 174 in this instance does not serve to close its outlet upon the completion of its discharge stroke and for this reason an additional spring seated valve 175 is provided in the casing of the pump to close the line from the pump during the intervals between discharge operations. The ball valve 176 enclosed in the piston assembly is retained by the sheet metal cup member 177. In this embodiment, it will be noticed that the liner 180 inside of the casing 179 forms the pump cylinder.

In Fig. 8, upon a reduced scale is diagrammatically shown one form of actuating mechanism for the pump structure of Fig. 7. The piston rod 181 is encircled by a spring 182 which reacts against the annular plug 183 fitted in the upper part 184 of the pump casing. The upper portion of the pump casing 184 serves to guide the upper portion of the pump plunger 181 in its reciprocating movements. Pivotally connected at 185 to the upper end of the piston rod 181 is the latch or follower 186 which cooperates with the cam 187. This cam may be driven from any suitable shaft around the mechanism to be lubricated.

When the pump is utilized as a pressure source for a central chassis lubricating system, this cam is conveniently driven from the generator or water pump shaft of the automobile. A manually actuated button 188 with a depending spring finger 189 serves to enable a limited control of the speed of the pump mechanism. Since the operation of the elements 188 and 189 in controlling the pump forms no part of the present invention, they will not be described in detail herein.

When the automatic pumping arrangement of Figs. 7 and 8 is used in connection with an automobile, it may be conveniently supported upon the engine upon one side thereof adjacent the front end and the cam or cams 187 may also be caused to drive a fuel pump arrangement, thus coordinating the feed of fuel and the feed of lubricant.

With the spring 172 in position, there is no inherent indication when the pump is receiving no lubricant, and when the reservoir should be refilled as in Fig. 2.

Therefore, it is desirable to provide some indicator means, conveniently connected to the dashboard of the automobile, to warn the driver when the pump is not delivering its charge of lubricant and when the reservoir has become empty.

In the embodiment of Figs. 9 and 10, the lever 190 at its end adjacent the reservoir is provided with a clevis 191, the jaws of which are slotted at 192. Within these slotted jaws project the flatted pin 193, which passes through and pivots in the upper end of the piston rod 194. A front view of this connection between a clevised lever and the upper end of the piston appears in Fig. 17, with a slightly different lever arrangement.

The other end of the lever 190 is provided with the roller 195 which serves as a follower to cooperate with a suitable cam arrangement (not shown) driven by the machine to be lubricated. The lever 190 is pivotally connected to the bracket 196 by the pin 197. To prevent rattling or looseness, a coil spring 198 passes around this pin and has extensions 199 and 200 which respectively react against the base of the clevis 191 and the pin 201 attached to the side of the bracket 196.

In Figs. 11 and 12, is shown a linkage between the reservoir and the lever 211 and the upper end of the piston rod 212. The linkage is shown in side view in Fig. 11, in top view in Fig. 12 (and is also shown in rear view in Fig. 24, which said last mentioned figure shows a slight re-arrangement of the actuating arrangement). The linkage arrangement consists of two offset members 202 on either side of the piston rod through the upper and lower ends of which respectively pass the pins 203 and 204. These pins 203 and 204 also respectively pass through the adjacent ends of the actuating lever and the piston rod, the ends of each of which are enclosed between the ends of the pair of links 202. In Fig. 11, the protuberances 205 adjacent the top of the piston rod limit downward movement of the piston rod, particularly when the bottom of the pump cylinder is removed to inspect or replace the filter disk. To prevent rattling of a linkage connection between the lever 211 and the connecting rod 212, a spring 215 is provided similar to that of Figs. 9 and 10. The support bracket 220 is provided with inturned tang 213 against which one end 214 of the coil spring 215 reacts. The other end of the coil spring 215 is bent over the end 217 of the lever 211 adjacent to the linkage 202. The lever is provided with a finger 219 which cooperates with the rear portion of the bracket 220 to limit the movement of the plunger.

In Fig. 13, an alternative form of lever 221 is shown, which is provided with an adjustable stop 222 to react against the side of the tank 223. The plunger in this case is actuated by gripping the upper end 224 of the lever and pulling it backwardly toward the operator. The connection between the lever and the upper end of the piston rod is as already described and shown in connection with Fig. 2.

In Figs. 14 and 15, the tank 231 is of rectangular form and is provided with the brackets 232 to enable attachment of it to the chassis body adjacent the bottom of the dashboard and under the scuttle. The bellcrank lever 233 is provided with a horizontal bearing 234 on top of the tank, the actuating end of the lever projecting through the dashboard and being provided with a pedal means 234' to permit of foot operation. The filler neck 235 projects forwardly of the tank and is provided with a cap 236 which may be removed upon filling. Within the filler neck 235 depends mesh filter 237 for removing any impurities in the oil before entrance into the tank 231. If desired, the oil from the tank 231 may also be pumped to another oil reservoir by the connection 238, as for example, to the engine oil pump reservoir to replenish it.

In Figs. 16 to 20, the actuating lever 250 is connected at its outer end 251 to the rod 252 which projects through the dashboard 253 and extends through the cylinder 254 projecting inwardly from the dashboard. The rear end of the rod 252 which is adjacent the driver of the automobile, is provided with a handle 255. The rod 252 is provided with a spring 256 which extends from the retainer 257 upon the rod to the closure 258 at the rear end of the cylinder 254. The rear end of the cylinder 254 is provided with an additional spaced closure 259 and between this closure and the closure 258 is contained packing material 260, thus substantially closing the driver's compartment from the engine compartment in front of the dashboard 253. This arrangement will substantially prevent any of the fumes or hot gases from the engine compartment passing into the body of the automobile.

As shown in Figs. 16 and 20, the arrangement of Figs. 18 and 19 may be augmented or replaced by a shutter arrangement consisting of a felt pad 272 having a slit 273 therein closing the opening 274 through which the rod 252 projects. The felt pad 272 is firmly held around the edges of this opening by means of the plate 275 and the screws 276. As shown in Fig. 20, the pull rod 252 slightly turns apart from the edges of the felt slit, thus assuring a more perfect closure between the driver's space and the engine space.

In the embodiment of Figs. 16 to 20, the lever is provided with an adjustable stop 277 which has a threaded shank 278 fitted into the boss 279 at the lower end of said lever. By replacing or adding shims 280 of different thickness under the head of the stop 277 different effective pump strokes may be obtained.

It will be noted that the lever 259 is offset at 281 (see particularly Fig. 17). This offset is provided so that the lever 259, when drawn rearwardly to charge the pump, as shown in the dot and dash lines in Fig. 16, may partly come within the outer edge of the tank as indicated at 282.

In Fig. 21, the pump is actuated by means of a rack and pinion arrangement 283 and 284, the pinion 284 being driven by the lever 285 which is, in turn, actuated by the pull rod 286. The rack 283 is positioned upon a lever 287 which is pivotally connected at 288 to the dashboard or other supporting member 289 and is connected at its forward end 290 to the top of the piston. The finger 291 serves to limit the stroke of the pump by contact with the supporting member 289.

In Figs. 22 and 23 another arrangement for closing the engine compartment from the driver's compartment is shown. The pull rod 252, as shown in the embodiment of Figs. 16 to 20, is attached to a plate 293 which slides within the closure 294, which is attached to the dashboard or other support 295 by the screws 296. The plate 293 will move upwardly and downwardly within the closure 294 to prevent passage of hot gases or fumes through the opening 297 in the support 295 and the slot 298 in the closure 294.

In Fig. 24 is shown an arrangement for lubricating the pivot bearing of the actuating lever, particularly when it extends horizontally over the top of the reservoir so that its actuated arm may be positioned alongside of the reservoir, as shown in Figs. 14 and 15.

The horizontal portion 261 of the lever 280 has bearings in the sleeve 262 which is supported on the tank 263 by the bracket 270. These bearings are lubricated from the tank 263 by the wick 264 which is retained in the tubular receiver 265 by the spring 266. Around the outside of the sleeve 262 is the coil spring 267, the ends of which are bent over at 268 and 269 to react against the bracket 270 and the piston end of the bell crank lever 271 to prevent rattling.

The connection of the inner or front end of the short arm of the actuating lever to the piston rod or connecting rod is substantially the same in Figs. 2 and 13; in Figs. 9, 10, 14, 15, 16, 17 and 21; and in Figs. 11, 12 and 24. These various embodiments, of course, may be used interchangeably as may also the pump constructions of Figs. 2, 5, 6 and 7. The pedal actuating arrangements of Figs. 2, 14 and 15, and the manual actuating arrangements of Figs. 11, 12, 13, 14, 15, 16, 17, 21 and 24 may be utilized in connection with any of the pump units shown in Figs. 2, 5, 6 and 7.

In several commercial embodiments, the pump unit of Fig. 5 was utilized with the actuating arrangement of Figs. 16 to 20, while the pump unit of Fig. 6 was utilized with the actuating arrangement of Figs. 14, 15 and 24.

The arrangement of Fig. 24, of course, may be conveniently incorporated in Figs. 11 and 12, in Fig. 13 and in Figs. 16 and 17, and particularly in Figs. 14 and 15, when it is desired to have the operating end of the lever arrangement move along the side of the tank, while the piston end of the actuating lever is positioned above the tank. The adjustable stroke limiting stops n of Fig. 2, 222 of Fig. 13 and 277 of Fig. 16 may be moved from the lever to the tank or dashboard against which the lever is to be stopped.

The present application continues in part the subject-matter of application, Serial No. 93,582, filed March 10, 1926, which has matured into Patent No. 1,862,482, dated June 7, 1932, Figs. 1, 2 and 3 of the present application corresponding respectively to Figs. 1, 2 and 4 of said prior application. Fig. 4 of the present application corresponds to Fig. 5 of the application of Joseph Bijur, Serial No. 9,544, filed February 16, 1925.

The pump of the present invention may also be utilized to supply lubricant to single bearings, and also for distributing liquid for other purposes. The distributing system including both the measuring valves of Fig. 4 and the drip plugs of Fig. 5 may also be supplied by other pressure sources than those specifically shown.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

I claim:—

1. A central lubricating installation for a mechanism with a plurality of bearings comprising a lubricant pump, a branched distributing piping system leading to the bearings, and a plurality of lubricant metering outlets at said bearings, some of said outlets including highly restricted flow proportioning drip plug outlets and others including measuring valve outlets, said drip plug outlets serving to relieve the pressure in said piping system whereby return of said measuring valves is permitted after discharge of said pump into said system.

2. A central lubricating installation for a mechanism with a plurality of bearings comprising a spring discharged, manually actuated plunger pump, a branched distributing piping system leading to the bearings, and a plurality of lubricant metering outlets at said bearings, some of said outlets including highly restricted flow proportioning drip plug outlets and others including measuring valve outlets, the discharge volume of said pump being substantially greater than the total discharge volume of said measuring valves and the discharge pressure of said pump being substantially greater than the discharge pressure of said measuring valve so as to reciprocate them promptly after pressure application to discharged position, the excess of lubricant over that necessary to actuate the measuring valves being emitted through said drip plug outlets.

3. In a motor vehicle of the type having a chassis frame with a plurality of spaced bearings and a central chassis lubricating installation including a branched piping system with a plurality of outlets to the bearings including highly restricted drip plug flow proportioning devices; the combination therewith of a unitary pump and reservoir installation including a dashboard, a pump cylinder at the forward side thereof, means mounting said cylinder to said dash, a pump plunger, an operating lever connected to said plunger and having a pivot rigid with said cylinder and contiguous to said dashboard, said lever having a unitary pedal portion extending through a corresponding aperture in the dashboard, and operable by pressure of the driver's foot, the outlets being so restricted by said devices as only to permit very slow emission of lubricant to the bearings and to cause slow discharge of said pump into said piping system, whereby a substantial back pressure is built up in said piping system, said pump being provided with inlet and outlet valve means, and with inlet and outlet valve seats cooperating with said valve means, said inlet valve means being actuated to said inlet valve seat by said back pressure upon discharge of said pump, and said outlet valve means being actuated to said outlet valve seat upon completion of the discharge of said pump.

4. In a motor vehicle of the type having a chassis frame with a plurality of spaced bearings and a central chassis lubricating installation including a branched piping system with a plurality of outlets to the bearings including highly restricted drip plug flow proportioning devices; the combination therewith of a unitary pump and reservoir installation therefor including a dashboard, a reservoir affixed at the forward side of said board, a pump including a plunger extending through said reservoir and an operating lever for said plunger, having a pedal portion extending rearward through a corresponding aperture in the dash, the outlets being so restricted by said devices as only to permit very slow emission of lubricant to the bearings and to cause slow discharge of said pump into said piping system, whereby a substantial back pressure is built up in said piping system, said pump being provided with inlet and outlet valve means, and with inlet and outlet valve seats cooperating with said valve means, said inlet valve means being actuated to said inlet valve seat by said back pressure upon discharge of said pump, and said outlet valve means being actuated to said outlet valve seat upon completion of the discharge of said pump.

5. In a mechanism of the type having a plurality of spaced bearings and a central lubricating installation including a branched piping system with a plurality of outlets to the bearings including highly restricted drip plug flow proportioning devices; the combination therewith of a unitary pump and reservoir installation including a reservoir, a piston therein near the lower end thereof having a rod protruding upward through the upper part of said reservoir, an operating lever having a pivot mount at the top of said reservoir and coacting with the upper protruding end of said rod, said lever having a manually actuated portion integral therewith; the outlets being so restricted by said devices as only to permit very slow emission of lubricant to the bearings and to cause slow discharge of said pump into said piping system, whereby a substantial back pressure is built up in said piping system, said pump being provided with inlet and outlet valve means, and with inlet and outlet valve seats cooperating with said valve means, said inlet valve means being actuated to said inlet valve seat by said back pressure upon discharge of said pump and said outlet valve means being actuated to said outlet valve seat upon completion of the discharge of said pump.

6. In a mechanism of the type having a plurality of spaced bearings and a central lubricating installation including a branched piping system with a plurality of outlets to the bearings including highly restricted drip plug flow proportioning devices; the combination therewith of a unitary pump and reservoir installation including a unitary reservoir structure having a bottom, a top, and a side wall, a closure for a filling opening at said top, said reservoir having rigid therewith a well extending below the bottom thereof, a piston in said well, a piston rod secured to said piston and extending vertically the height of said reservoir and protruding through the top thereof, and an operating lever for said piston having a pivotal mount at the top of said reservoir and including a manually actuated part; the outlets being so restricted by said devices as only to permit very slow emission of lubricant to the bearings and to cause slow discharge of said pump into said piping system, whereby a substantial back pressure is built up in said piping system, said pump being provided with inlet and outlet valve means, and with inlet and outlet valve seats cooperating with said valve means, said inlet valve means being actuated to said inlet valve seat by said back pressure upon discharge of said pump and said outlet valve means being actuated to said outlet valve seat upon completion of the discharge of said pump.

7. In a mechanism of the type having a plurality of spaced bearings and a central lubricating installaton including a branched piping system with a plurality of outlets to the bearings including highly restricted drip plug flow proportioning devices; the combination therewith of a unitary pump and reservoir installation including a reservoir having a generally cylindrical well extending below the bottom thereof, a piston in said well, a piston rod extending through the height of said reservoir and protruding above the top thereof, a spring encircling said rod and reacting against said piston to move the same to one end of its stroke, and operating means coacting with the protruding end of said piston rod; the outlets being so restricted by said devices as only to permit very slow emission of lubricant to the bearings and to cause slow discharge of said pump into said piping system, whereby a substantial back pressure is built up in said piping system, said pump being provided with inlet and outlet valve means, and with inlet and outlet valve seats cooperating with said valve means, said inlet valve means being actuated to said inlet valve seat by said back pressure upon discharge of said pump and said outlet valve means being actuated to said outlet valve seat upon completion of the discharge of said pump.

8. In a mechanism of the type having a plurality of spaced bearings and a central lubricating installation including a branched piping system with a plurality of outlets to the bearings including highly restricted drip plug flow proportioning devices; the combination therewith of a unitary pump and reservoir installation including a unitary reservoir structure including a side wall having a bottom integral therewith and a top integral therewith, a filling neck to one side of said top having a displaceable closure, a well unitary with said bottom extending therebelow and laterally of said filling plug, a removable head for the lower end of said well and affording an outlet from said reservoir, a piston within said well, a piston rod connected thereto and extending vertically of said reservoir through the top thereof, a coil spring encircling said rod reacting against the top of the reservoir and against a part of said piston structure to urge the end thereof toward said head and operating means coacting with the protruding end of said piston rod; the outlets being so restricted by said devices as only to permit very slow emission of lubricant to the bearings and to cause slow discharge of said pump into said piping system, whereby a substantial back pressure is built up in said piping system, said pump being provided with inlet and outlet valve means, and with inlet and outlet valve seats cooperating with said valve means, said inlet valve means being actuated to said inlet valve seat by said back pressure upon discharge of said pump and said outlet valve means being actuated to said outlet valve seat upon completion of the discharge of said pump.

9. In a motor vehicle of the type having a chassis frame with a plurality of spaced bearings and a central chassis lubricating installation including a branched piping system with a plurality of outlets to the bearings including highly restricted drip plug flow proportioning devices; the combination therewith of a unitary pump and reservoir installation including a unitary reservoir structure having means for attachment thereof, a well unitary with said reservoir eccentrically of said reservoir and contiguous to said dashboard in mounted position, a piston in said well, a piston rod secured thereto and protruding through the top of the reservoir, a spring encircling said rod and reacting against said top to urge the piston to discharging position, and an operating lever pivoted to the reservoir top near the place of attachment, coacting at its free end with the protruding part of the piston and having a pedal portion accessible from in back of the place of attachment, thereby providing a substantial leverage for overcoming the spring, the outlets being so restricted by said devices as only to permit very slow emission of lubricant to the bearings and to cause slow discharge of said pump into said piping system, whereby a substantial back pressure is built up in said piping system, said pump being provided with inlet and outlet valve means, and with inlet and outlet valve seats cooperating with said valve means, said inlet valve means being actuated to said inlet valve seat by said back pressure upon discharge of said pump and said outlet valve means being actuated to said outlet valve seat upon completion of the discharge of said pump.

10. In a mechanism of the type having a plurality of spaced bearings and a central lubricating installation including a branched piping system with a plurality of outlets to the bearings including highly restricted drip plug flow proportioning devices; the combination therewith of a unitary pump and reservoir installation including a reservoir, a spring-discharged pump plunger therein, a removable head limiting the discharge stroke of said pump plunger, and a filter device associated with said removable head through which the lubricant is forced in the discharge of the pump; the outlets being so restricted by said devices as only to permit very slow emission of lubricant to the bearings and to cause slow discharge of said pump into said piping system, whereby a substantial back pressure is built up in said piping system, said pump being provided with inlet and outlet valve means, and with inlet and outlet valve seats cooperating with said valve means, said inlet valve means being actuated to said inlet valve seat by said back pressure upon discharge of said pump and said outlet valve means being actuated to said outlet valve seat upon completion of the discharge of said pump.

11. In a mechanism of the type having a plurality of spaced bearings and a central lubricating installation including a branched piping system with a plurality of outlets to the bearings including highly restricted drip plug flow proportioning devices; the combination therewith of a unitary pump and reservoir installation including a reservoir having a pump cylinder structure rigid therewith, a removable head for said cylinder structure affording an outlet therethrough to the pipe line, a filter disk removably retained at said head, a piston in said cylinder, a piston rod extending upward therefrom through the top of said reservoir, a spring encircling said rod reacting against said top and urging the piston downward, said piston having an end portion pressed by the spring in one direction; the outlets being so restricted by said devices as only to permit very slow emission of lubricant to the bearings and to cause slow discharge of said pump into said piping system, whereby a substantial back pressure is built up in said piping system, said pump being provided with inlet and outlet valve means, and with inlet and outlet valve seats cooperating with said valve means, said inlet valve means being actuated to said inlet valve seat by said back pressure upon discharge of said pump and said outlet valve means being actuated to said outlet valve seat upon completion of the discharge of said pump.

12. In a motor vehicle of the type having a chassis frame with a plurality of spaced bearings and a central chassis lubricating installation including a branched piping system with a plurality of outlets to the bearings including highly restricted drip plug flow proportioning devices; the combination therewith of a unitary pump and reservoir installation including a dashboard, a lubricant reservoir affixed to the forward side of said dashboard and adjacent the lower end thereof, an operating pedal pivoted to the reservoir structure adjacent the dashboard, a pump plunger extending vertically of said reservoir contiguous to the dashboard, protruding at its upper end from the top of the reservoir and engaged by the free end of said lever, said lever having a pedal portion protruding through a corresponding aperture in the dashboard, whereby a pedal operation will effect a displacement of said piston rod through a short range, a piston of relatively large diameter at the lower end of said rod, and a pump cylinder encircling said piston and formed rigid with said reservoir; the outlets being so restricted by said devices as only to permit very slow emission of lubricant to the bearings and to cause slow discharge of said pump into said piping system, whereby a substantial back pressure is built up in said piping system, said pump being provided with inlet and outlet valve means, and with inlet and outlet valve seats cooperating with said valve means, said inlet valve means being actuated to said inlet valve seat by said back pressure upon discharge of said pump and said outlet valve means being actuated to said outlet valve seat upon completion of the discharge of said pump.

13. In a mechanism of the type having a plurality of spaced bearings and a central lubricating installation including a branched piping system with a plurality of outlets to the bearings including highly restricted drip plug flow proportioning devices; the combination therewith of a unitary pump and reservoir installation including a pump cylinder associated therewith, a piston therein, an outlet head at one end of said cylinder, a spring normally urging said piston to the discharge end of its stroke, a valve controlled passage through said piston, and a strainer carried by said piston in advance of the valve; the outlets being so restricted by said devices as only to permit very slow emission of lubricant to the bearings and to cause slow discharge of said pump into said piping system, whereby a substantial back pressure is built up in said piping system, said pump being provided with inlet and outlet valve means, and with inlet and outlet valve seats cooperating with said valve means, said inlet valve means being actuated to said inlet valve seat by said back pressure upon discharge of said pump and said outlet valve means being actuated to said outlet valve seat upon completion of the discharge of said pump.

14. In a mechanism of the type having a plurality of spaced bearings and a central lubricating installation including a branched piping system with a plurality of outlets to the bearings including highly restricted drip plug flow proportioning devices; the combination therewith of a unitary pump and reservoir installation including a reservoir, a pump cylinder rigid therewith extending below the bottom thereof, an outlet cap secured upon the lower end of said cylinder, a filter disk peripherally clamped by said cap, a piston in said cylinder, a spring urging said piston to the discharge end of its stroke, and a valve controlled port through said piston; the outlets being so restricted by said devices as only to permit very slow emission of lubricant to the bearings and to cause slow discharge of said pump into said piping system, whereby a substantial back pressure is built up in said piping system, said pump being provided with inlet and outlet valve means, and with inlet and outlet valve seats cooperating with said valve means, said inlet valve means being actuated to said inlet valve seat by said back pressure upon discharge of said pump and said outlet valve means being actuated to said outlet valve seat upon completion of the discharge of said pump.

15. In a mechanism of the type having a plurality of spaced bearings and a central lubricating installation including a branched piping system with a plurality of outlets to the bearings including highly restricted drip plug flow proportioning devices; the combination therewith of a unitary pump and reservoir installation including a reservoir, a pump cylinder extending below the bottom thereof, an outlet cap closing the lower end of said cylinder, a piston in said cylinder having a rod connected thereto, a spring coiled about said rod and urging said piston to the discharge end of its stroke, a filter disk peripherally clamped within the cap structure, said piston having a normally open check valve therein past which lubricant from the reservoir will drain; the outlets being so restricted by said devices as only to permit very slow emission of lubricant to the bearings and to cause slow discharge of said pump into said piping system, whereby a substantial back pressure is built up in said piping system, said pump being provided with inlet and outlet valve means, and with inlet and outlet valve seats cooperating with said valve means, said inlet valve means being actuated to said inlet valve seat by said back pressure upon discharge of said pump and said outlet valve means being actuated to said outlet valve seat upon completion of the discharge of said pump.

16. In a mechanism of the type having a plurality of spaced bearings and a central lubricating installation including a branched piping system with a plurality of outlets to the bearings including highly restricted drip plug flow proportioning devices; the combination therewith of a unitary pump and reservoir installation including a reservoir, a pump cylinder extending below the bottom thereof, an outlet cap closing the lower end of said cylinder, a piston in said cylinder having a rod connected thereto, a spring coiled about said rod and urging said piston to the discharge end of its stroke, a filter disk peripherally clamped within the cap structure, said piston having a normally open check valve therein past which lubricant from the reservoir will drain, the seating portion of the piston comprising a hollow plug in which the valve is enclosed, a socket being secured to the piston rod, said plug and said socket serving to clamp the piston therebetween, and a strainer cup being connected between the extremity of the piston rod and the outer periphery of the piston; the outlets being so restricted by said devices as only to permit very slow emission of lubricant to the bearings and to cause slow discharge of said pump into said piping system, whereby a substantial back pressure is built up in said piping system, said pump being provided with inlet and outlet valve means, and with inlet and outlet valve seats cooperating with said valve means, said inlet valve means being actuated to said inlet valve seat by said back pressure upon discharge of said pump and said outlet valve means being actuated to said outlet valve seat upon completion of the discharge of said pump.

17. In a mechanism of the type having a plurality of spaced bearings and a central lubricating installation including a branched piping system with a plurality of outlets to the bearings including highly restricted drip plug flow proportioning devices; the combination therewith of a unitary pump and reservoir installation including a piston rod, a thimble having its head secured to one end of said rod, a piston assembly, a plug having a shoulder urging said assembly securely in position against said thimble, a valve encased in said plug, normally open to allow lubricant to pass therebeyond and a seat against which said valve is urged during the discharge stroke of the piston; the outlets being so restricted by said devices as only to permit very slow emission of lubricant to the bearings and to cause slow discharge of said pump into said piping system, whereby a substantial back pressure is built up in said piping system, said pump being provided with inlet and outlet valve means, and with inlet and outlet valve seats cooperating with said valve means, said inlet valve means being actuated to said inlet valve seat by said back pressure upon discharge of said pump and said outlet valve means being actuated to said outlet valve seat upon completion of the discharge of said pump.

18. In a mechanism of the type having a plurality of spaced bearings and a central lubricating installation including a branched piping system with a plurality of outlets to the bearings including highly restricted drip plug flow proportioning devices; the combination therewith of a unitary pump and reservoir installation including a reservoir, a cylinder associated therewith, a piston rod, a valve cage secured to one end of said rod, a piston, said valve cage serving as a clamp for securing in place the inner periphery of the piston; the outlets being so restricted by said devices as only to permit very slow emission of lubricant to the bearings and to cause slow discharge of said pump into said piping system, whereby a substantial back pressure is built up in said piping system, said pump being provided with inlet and outlet valve means, and with inlet and outlet valve seats cooperating with said valve means, said inlet valve means being actuated to said inlet valve seat by said back pressure upon discharge of said pump and said outlet valve means being actuated to said outlet valve seat upon completion of the discharge of said pump, the lower part of said cylinder being formed into the outlet valve seat and the lower part of said valve cage being formed into the outlet valve cooperating with said outlet valve seat, said cage receiving said inlet valve.

19. In a mechanism of the type having a plurality of spaced bearings and a central lubricating installation including a branched piping system with a plurality of outlets to the bearings including highly restricted drip plug flow proportioning devices; the combination therewith of a unitary pump and reservoir installation including a reservoir, a pump cylinder associated therewith, a valve cage, a valve therein, a piston rod, a socket at the end thereof, said valve cage threaded into said socket and a piston of annular construction clamped in position by said cage against said socket, the outlets being so restricted by said devices as only to permit very slow emission of lubricant to the bearings and to cause slow discharge of said pump into said piping system, whereby a substantial back pressure is built up in said piping system, said pump being provided with inlet and outlet valve means, and with inlet and outlet valve seats cooperating with said valve means, said inlet valve means being actuated to said inlet valve seat by said back pressure upon discharge of said pump and said outlet valve means being actuated to said outlet valve seat upon completion of the discharge of said pump, the lower part of said cylinder being formed into the outlet valve seat and the lower part of said valve cage being formed into the outlet valve cooperating with said outlet valve seat, said cage receiving said inlet valve.

20. A supply installation for a chassis lubricating system comprising a lubricant reservoir adapted to be fixed to a dashboard, and having a pump plunger associated therewith, a pivoted operating lever having a pedal accessible from in back of the dash, a loose connection between the lever and the piston rod to accommodate the rocking movement of the latter relative to the former and a spring retaining said lever against rattling at said loose connection.

21. A supply installation for a chassis lubricating system including a reservoir adapted to be secured to a dashboard, a vertical pump plunger therethrough projecting above the top of said reservoir, an operating lever pivoted near the top of said reservoir and having a pedal portion adapted to extend through the dashboard, said lever having a forked portion straddling the upper end of said piston rod, stops on the latter limiting the movement of said forked portion relative thereto and a spring coiled about said plunger and reacting against the forked portion to maintain the lever against rattling.

22. In combination with a central lubricating installation for supplying a plurality of spaced bearings and provided with flow metering outlets connected to said bearings, a source of lubricant supply and pressure comprising a reservoir, an inlet opening adjacent said top of said reservoir, a pump structure adjacent the bottom of said reservoir and depending therebelow, an actuating rod extending from the pump structure up through the reservoir and passing through the top of the reservoir, an actuating lever pivotally supported upon the top of the reservoir having a pivotal clevis connection to the top of the actuating rod, a coil spring within the reservoir encircling said actuating rod and extending from the top to the bottom of the reservoir, said coil spring serving to actuate the pump mechanism to discharge position and being stressed upon charging of the pump.

23. In combination with a central lubricating system feeding a plurality of spaced bearings and being provided with flow proportioning outlets connected to said bearings, a source of lubricant pressure comprising a reservoir, a pump construction attached to and depending from the bottom of the reservoir, a connecting rod extending upwardly from said pump to the top of said reservoir, an actuating lever, a fixed clevis attached to the top of said reservoir affording a pivotal support for said actuating lever and a clevis link construction connecting the top of said connecting rod and the adjacent end of said actuating lever.

24. In a mechanism having a plurality of spaced bearings and a central lubricating installation including a branched piping system with a plurality of outlets to the bearings including highly restricted drip plug flow proportioning devices; the combination therewith of a unitary pump and reservoir installation, said installation comprising a pump with a cylinder and a spring discharge piston and a removable filter disk at the outlet end of the pump and in advance of said piping system, the outlets being so restricted by said devices as only to permit very slow emission of lubricant to the bearings and to cause slow discharge of said pump into said piping system, whereby a substantial back pressure is built up in said piping system, said pump being provided with inlet and outlet valve means, and with inlet and outlet valve seats cooperating with said valve means, said inlet valve means being actuated to said inlet valve seat by said back pressure upon discharge of said pump and said outlet valve means being actuated to said outlet valve seat upon completion of the discharge of said pump.

25. In a mechanism having a plurality of spaced bearings and a central lubricating installation including a branched piping system with a plurality of outlets to the bearings including highly restricted drip plug flow proportioning devices; the combination therewith of a unitary pump and reservoir installation, said installation comprising a pump with a cylinder and a spring discharged piston, the outlets being so restricted by said devices as only to permit very slow emission of lubricant to the bearings and to cause slow discharge of said pump into said piping system, whereby a substantial back pressure is built up in said piping system, said pump being provided with inlet and outlet valve means, and with inlet and outlet valve seats cooperating with said valve means, said inlet valve means being actuated to said inlet valve seat by said back pressure upon discharge of said pump and said outlet valve means being actuated to said outlet valve seat upon completion of the discharge of said pump.

EDWARD H. KOCHER.